United States Patent
Zhou

(10) Patent No.: US 8,462,926 B2
(45) Date of Patent: Jun. 11, 2013

(54) METHOD FOR FILTERING INCOMING CALLS TO COMMUNICATION DEVICE

(75) Inventor: Ying Zhou, Shenzhen (CN)

(73) Assignees: Shenzhen Futaihong Precision Industry Co., Ltd., Shenzhen (CN); Chi Mei Communication Systems, Inc., New Taipei (TW)

(*) Notice: Subject to any disclaimer, the term of this patent is extended or adjusted under 35 U.S.C. 154(b) by 248 days.

(21) Appl. No.: 12/986,190

(22) Filed: Jan. 7, 2011

(65) Prior Publication Data

US 2012/0106723 A1  May 3, 2012

(30) Foreign Application Priority Data

Nov. 2, 2010  (CN) .......................... 2010 1 0528497

(51) Int. Cl.
*H04M 1/57* (2006.01)

(52) U.S. Cl.
USPC .............. 379/142.06; 379/142.1; 379/114.29; 379/82

(58) Field of Classification Search
USPC .............. 379/142.06, 142.1, 114.29, 82, 179, 379/207.08, 406.08, 390.02
See application file for complete search history.

(56) References Cited

U.S. PATENT DOCUMENTS

| | | | | |
|---|---|---|---|---|
| 7,116,769 | B2 * | 10/2006 | Hama | 379/142.05 |
| 7,822,188 | B1 * | 10/2010 | Kirchhoff et al. | 379/211.02 |
| 2006/0210024 | A1 * | 9/2006 | Qiu | 379/88.01 |

* cited by examiner

*Primary Examiner* — Duc Nguyen
*Assistant Examiner* — Yosef K Laekemariam
(74) *Attorney, Agent, or Firm* — Altis Law Group, Inc.

(57) ABSTRACT

The present disclosure provides a method for filtering an incoming call to a communication device. The communication device stores a default ring duration M and a default call frequency N. The communication device may calculate the ring duration of an incoming call, and further determines whether the ring duration reaches the default ring duration M. If the ring duration does not reach the default ring duration M, the communication device determines whether a call frequency of the incoming call reaches the default call frequency N. If the call frequency reaches the default call frequency N, the communication device blocks a phone number of the incoming call.

9 Claims, 3 Drawing Sheets

METHOD FOR FILTERING INCOMING CALLS TO COMMUNICATION DEVICE

BACKGROUND

1. Technical Field

The present disclosure relates to a method for filtering incoming calls to a communication device.

2. Description of Related Art

A suspicious incoming call, such as a fraudulent call, generally rings once and terminates to entice a mobile phone user to call back. Once the mobile phone user calls back, he or she may be defrauded by caller of the fraudulent call, or may be charged for costly phone fee. Although some filter software implemented in a mobile phone may filter the fraudulent call, some normal phone calls which ring once and terminate may also be filtered.

DETAILED DESCRIPTION

Figure 1:
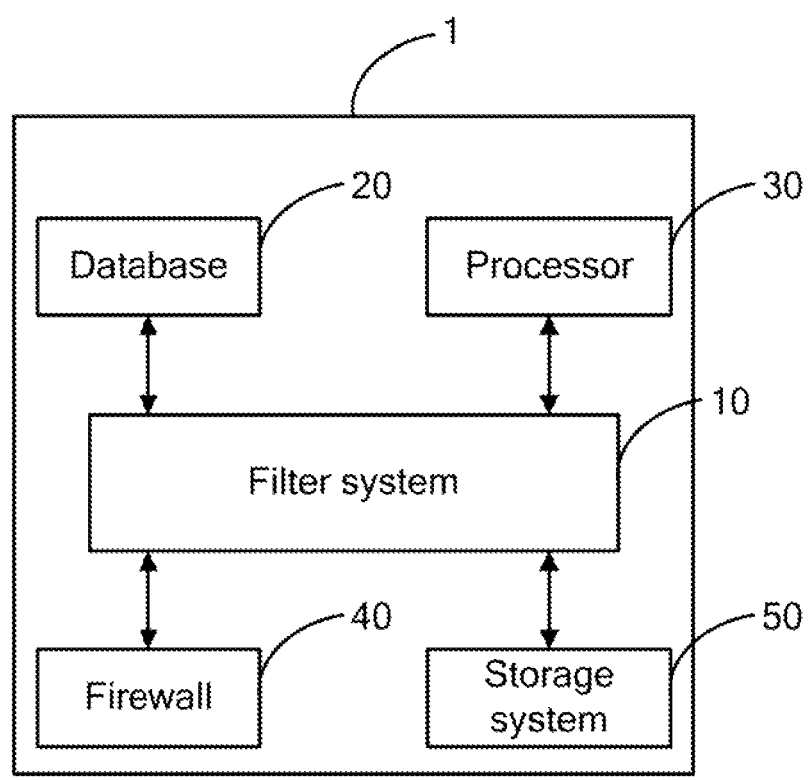
FIG. 1 is a block diagram of one embodiment of a communication device.

FIG. 1 is a block diagram of one embodiment of a communication device 1. The communication device 1 may be a mobile phone or a mobile Internet device (MID), for example. The communication device 1 includes a filter system 10, a database 20, a processor 30, a firewall 40, and a storage system 50. The database 20 stores a default ring duration M and a default call frequency N. The default ring duration M and the default call frequency N are filter parameters configured to filter an incoming call received in the communication device 1. The filter system 10 filters the incoming call based on the default ring duration M and the default call frequency N. The firewall 40 includes a block list and may block the incoming call based on the block list.

In general, the word "module" as used herein, refers to logic embodied in hardware or firmware, or to a collection of software instructions, written in a programming language, such as, for example, Java, C, or Assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 2:
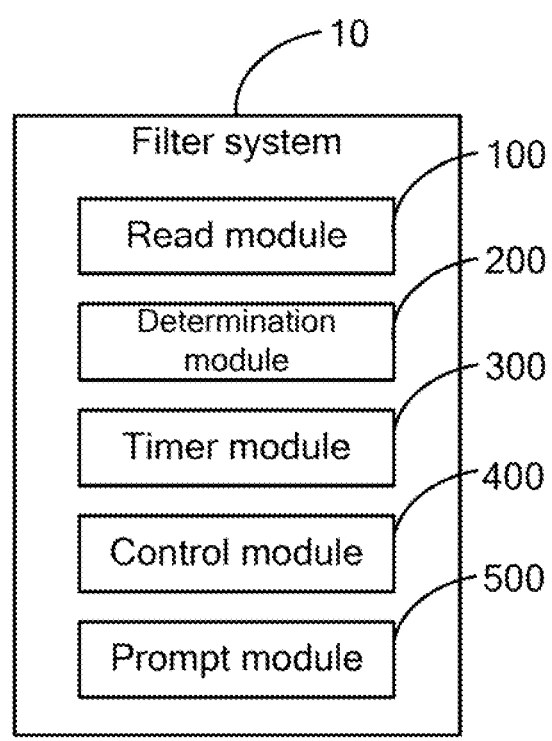
FIG. 2 is a block diagram of one embodiment of a filter system shown in FIG. 1.

FIG. 2 is a block diagram of one embodiment of the filter system 10 shown in FIG. 1. The filter system 10 includes a read module 100, a determination module 200, a timer module 300, a control module 400, and a prompt module 500. The modules 100-500 may comprise computerized code in the form of one or more programs that are stored in the storage system 50. The computerized code includes instructions that are executed by the processor 30 to provide functions for the modules 100-500.

The read module 100 reads a phone number of the incoming call, the default ring duration M, and the default call frequency N. The timer module 300 calculates ring duration of the incoming call when the default ring duration M is greater than zero. The determination module 200 determines whether the default ring duration M is greater than zero, whether the ring duration reaches the default ring duration M, and whether the phone number is stored in the database 20. In the embodiment, the default ring duration M can be set as 2 seconds. The determination module 200 determines that the incoming call is suspicious when the ring duration is shorter than 2 seconds, in one example.

The control module 400 stores the phone number in the database 20 when the ring duration does not reach the default ring duration M, the phone number is not stored in the database 20. If the phone number is stored in the database 20, the control module 400 deletes the phone number from the database 20 when the ring duration reaches the default ring duration M. The control module 400 records a call frequency of the incoming call when the ring duration does not reach the default ring duration M and the phone number is not stored in the database 20. The control module 400 increments the call frequency by one when the ring duration does not reach the default ring duration M and the phone number is stored in the database 20. In the embodiment, the default call frequency N can be set as five times. The control module 400 adds the phone number to the block list and then deletes the phone number from the database 20 when the ring duration does not reach the default ring duration M and the call frequency reaches five times.

Figure 3:
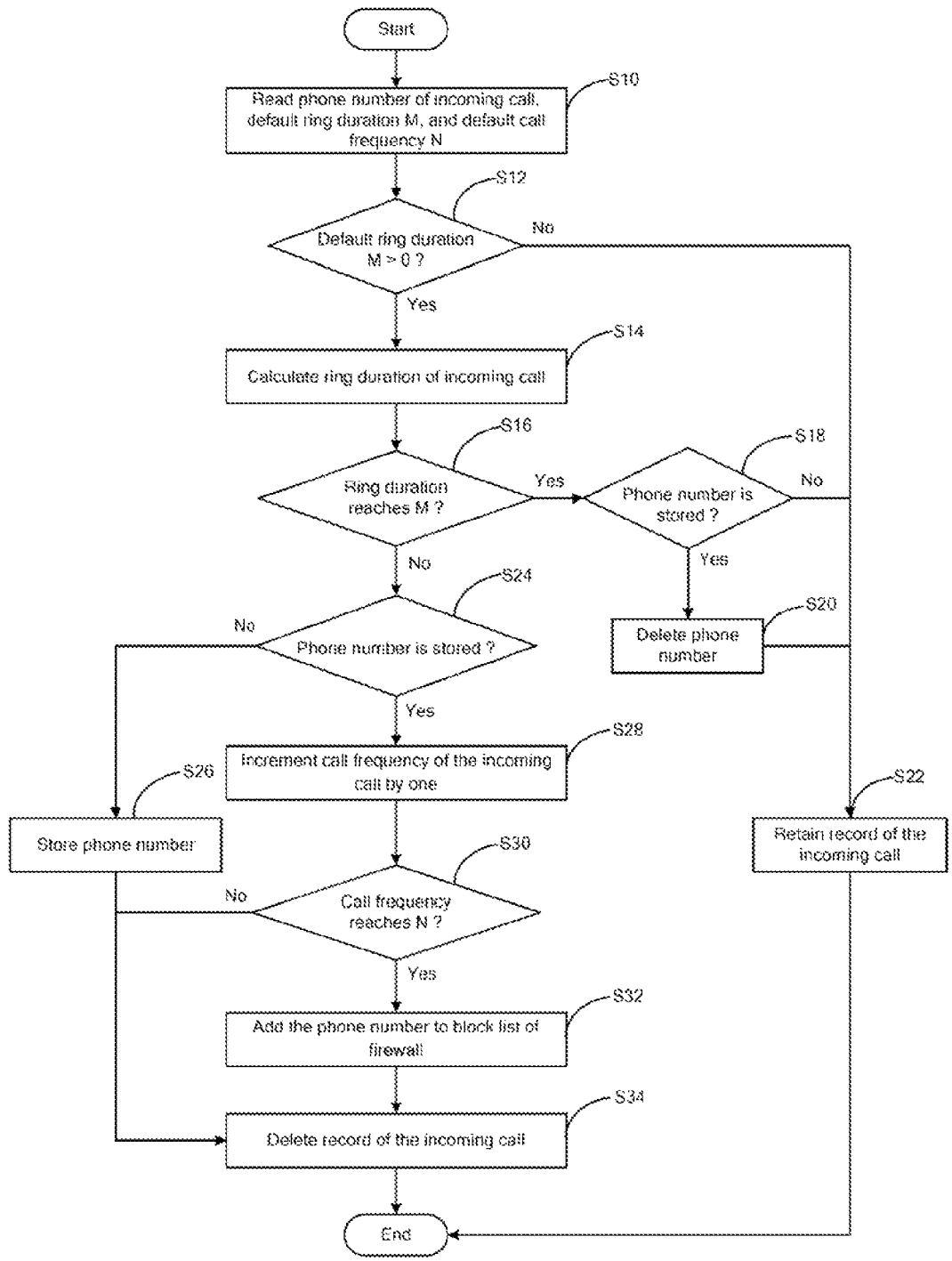
FIG. 3 is a flowchart illustrating one embodiment of a method for filtering an incoming call to a communication device.

FIG. 3 is a flowchart illustrating one embodiment of a method for filtering incoming calls to the communication device 1. Depending on the embodiment, additional blocks in the flow of FIG. 3 may be added, others removed, and the ordering of the blocks may be changed.

In block S10, The read module 100 reads the phone number of the incoming call, the default ring duration M, and the default call frequency N.

In block S12, The determination module 200 determines whether the default ring duration M is greater than zero. If the default ring duration M equals zero, block S22 is implemented.

If the default ring duration M is greater than zero, in block S14, the timer module 300 calculates the ring duration of the incoming call.

In block S16, the determination module 200 determines whether the ring duration reaches the default ring duration M. If the ring duration does not reach the default ring duration M, block S24 is implemented.

If the ring duration reaches the default ring duration M, in block S18, the determination module 200 further determines whether the phone number is stored in the database 20.

If the phone number is stored in the database 20, in block S20, the control module 400 deletes the phone number from the database 20.

If the phone number is not stored in the database 20, in block S22, the control module 400 retains a record of the incoming call generated by the processor 30. The control module 400 further instructs the prompt module 500 to prompt users that the incoming call occurred through a text message or a ring.

In block S24, the determination module 200 determines whether the phone number is stored in the database 20.

If the phone number is not stored in the database 20, in block S26, the control module 400 stores the phone number in the database 20. The control module 400 further records the call frequency.

If the phone number is stored in the database 20, in block S28, the control module 400 increments the call frequency by one.

In block S30, the determination module 200 determines whether the call frequency reaches the default call frequency N. If the call frequency does not reach the default call frequency N, block S34 is implemented.

If the call frequency reaches the default call frequency N, in block S32, the control module 400 adds the phone number to the block list of the firewall 40, and further deletes the phone number from the database 20.

In block S34, the control module 400 deletes the record of the incoming call, and further instructs the prompt module 500 not to prompt the users that the incoming call has occurred.

The present disclosure provides a method for filtering an incoming call to a communication device. A phone number of a fraudulent call which rings once and terminates can be blocked.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for filtering an incoming call to a communication device, the communication device comprising a database and a firewall, the method comprising:
    reading a phone number of the incoming call;
    storing the phone number in the database when a ring duration of the incoming call does not reach a default ring duration M and the phone number is not stored in the database, and recording a call frequency of the incoming call;
    incrementing the call frequency by one when the ring duration does not reach the default ring duration M and the phone number has been stored in the database;
    adding the phone number in a block list of the firewall when the call frequency reaches a default call frequency N to block incoming calls from the phone number; and
    deleting the phone number from the database when the ring duration reaches the default ring duration M and the phone number has been stored in the database, and prompting users that the incoming call is in process.

2. The method of claim 1, further comprising:
    deleting the phone number from the database when the call frequency reaches the default call frequency N.

3. The method of claim 2, before storing the phone number in the database, further comprising:
    retaining a record of the incoming call and prompting users that the incoming call is in process when the default ring duration M equals zero.

4. A communication device, comprising:
    a storage system;
    a database storing a default ring duration M and a default call frequency N;
    at least one processor;
    one or more programs stored in the storage system and being executable by the at least one processor, the one or more programs comprising:
    a read module that reads a phone number of an incoming call of the communication device;
    a determination module that determines whether ring duration of the incoming call reaches the default ring duration M and whether the phone number is stored in the database; and
    a control module that stores the phone number in the database when the ring duration does not reach the default ring duration M and the phone number is not stored in the database and stores the phone number in the firewall to block incoming calls from the phone number when the ring duration does not reach the default ring duration M and a call frequency of the incoming call reaches the default call frequency N;
    wherein the control module further deletes the phone number from the database when the ring duration reaches the default ring duration M and the phone number has been stored in the database; and
    a prompt module that prompts users that the incoming call is in process when the ring duration reaches the default ring duration M.

5. The communication device of claim 4, wherein the control module further deletes the phone number from the database when the call frequency reaches the default call frequency N.

6. The communication device of claim 5, wherein the control module further retains a record of the incoming call when the default ring duration M equals zero.

7. A non-transitory storage medium having stored thereon instructions that, when executed by a processor, causing the processor to perform a method for filtering an incoming call to a communication device, the communication device comprising a database and a firewall, wherein the method comprises:
    reading a phone number of the incoming call;
    storing the phone number in the database when a ring duration of the incoming call does not reach a default ring duration M and the phone number is not stored in the database, and recording a call frequency of the incoming call;
    incrementing the call frequency by one when the ring duration does not reach the default ring duration M and the phone number has been stored in the database;
    adding the phone number in a block list of the firewall when the call frequency reaches a default call frequency N to block incoming calls from the phone number; and
    deleting the phone number from the database when the ring duration reaches the default ring duration M and the phone number has been stored in the database, and prompting users that the incoming call is in process.

8. The non-transitory storage medium of claim 7, wherein the method comprises:
    delete the phone number from the database when the call frequency reaches the default call frequency N.

9. The non-transitory storage medium of claim 8, wherein before storing the phone number in the database, the method comprises:
    retaining a record of the incoming call and prompting users that the incoming call is in process when the default ring duration M equals zero.

* * * * *